(12) United States Patent
Heerdt

(10) Patent No.: US 9,762,141 B2
(45) Date of Patent: Sep. 12, 2017

(54) DRIVE CIRCUIT FOR ELECTRICAL LOAD

(71) Applicant: Control Techniques Limited, Newtown (GB)

(72) Inventor: Frank Weiner Heerdt, Montgomery (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 464 days.

(21) Appl. No.: 14/195,063

(22) Filed: Mar. 3, 2014

(65) Prior Publication Data
US 2014/0246913 A1 Sep. 4, 2014

(30) Foreign Application Priority Data

Mar. 1, 2013 (GB) .................................. 1303695.9

(51) Int. Cl.
| | |
|---|---|
| *H02M 1/12* | (2006.01) |
| *H02M 7/49* | (2007.01) |
| *H02M 5/458* | (2006.01) |
| *H02M 7/487* | (2007.01) |

(52) U.S. Cl.
CPC .............. *H02M 7/49* (2013.01); *H02M 5/458* (2013.01); *H02M 7/487* (2013.01); *Y10T 307/696* (2015.04)

(58) Field of Classification Search
CPC ............ H02J 3/38; H02J 9/04; Y10T 307/696
USPC .......................................................... 307/80
See application file for complete search history.

(56) References Cited

U.S. PATENT DOCUMENTS

| | | | |
|---|---|---|---|
| 5,625,545 A | 4/1997 | Hammond | |
| 6,229,722 B1* | 5/2001 | Ichikawa | ............... H02M 7/10 363/71 |
| 2009/0040800 A1* | 2/2009 | Sonnaillon | ............ H02M 7/219 363/89 |
| 2010/0067264 A1* | 3/2010 | Ohashi | ............... H02M 5/4585 363/37 |
| 2010/0142234 A1* | 6/2010 | Abolhassani | ............ H02M 7/49 363/41 |

FOREIGN PATENT DOCUMENTS

CN          102214984          10/2011

* cited by examiner

*Primary Examiner* — Rexford Barnie
*Assistant Examiner* — Toan Vu
(74) *Attorney, Agent, or Firm* — Harness, Dickey & Pierce, P.L.C.

(57) ABSTRACT

A circuit for an electrical load comprises a passive transformer, the secondary of which is connected to power cells for each phase according to the transformer tappings. Each power cell comprises a low cost but efficient power factor correction circuit to produce lower harmonics on the transformer.

9 Claims, 4 Drawing Sheets

DRIVE CIRCUIT FOR ELECTRICAL LOAD

CROSS-REFERENCE TO RELATED APPLICATION

This application claims the benefit and priority of Great Britain Patent Application No. 1303695.9 filed Mar. 1, 2013. The entire disclosure of the above application is incorporated herein by reference.

FIELD

This invention relates to drive circuits for electrical loads. The invention is particularly, but not exclusively, applicable to a drive circuit in which a rectified DC electrical output is produced from an AC supply.

BACKGROUND

A well known by-product of the rectification of an AC source of electrical power into a DC supply are the harmonics generated in the transformation and propagated through the electrical network back to the AC source. These harmonics are unwanted because they will increase circulating current for a given voltage and power therefore increasing the dissipation of power and cause distortion to the voltage which feeds other loads. The extra harmonics will create more circulating currents which are not consumed by the load. The AC source has to generate this power even though it is not used to drive the load. The additional current also means that the cabling has to be uprated to cope with the increased current. The parameter of power factor is widely used to measure such effects and is defined as the active power consumed divided by the active power plus the apparent power being generated. Ideally power factor needs to be unity. Increasing the power factor reduces the power factor. The typical conventional multi-phase rectifier circuit comprises a phase shifting transformer having multiple secondary outputs corresponding to the phase shift angles relative to the input. The output of the phase shifting transformer is supplied to banks of power cells, including a rectifier for each of the phase shift angles. The power cells each further comprise an inverter by which the multi-phase AC output is produced for use by the electrical load. The rectified power in the cells is supplied to each of the three phases of the load, for example an AC induction motor. For a given power requirement the phase shifting transformer is also known to be about larger than its simplest form of non-phase shifting transformer counterpart. However, the conventional transformer used to feed a rectifier comprising diode bridges will not improve the distorted current generated and they will need to be designed to be bigger in size and power rating to compensate for poor power factor.

Various module types have been proposed for the rectifier/inverter of multiphase power cells. A simple rectifier module has insulated gate bipolar transistors (IGBTs) for each leg connected across the phases and an accompanying DC link capacitor. The IGBTs take the full load rectified output of the rectifier circuit. This simple circuit has the benefit of low cost per power cell but has a relatively high input current harmonic content. An alternative approach is to replace the rectifying diodes in the above circuit with further active IGBT pairs per phase leg before the DC link capacitor. This solution has the benefit of being bi-directional and is able to limit the harmonic content by appropriate switching. However, the presence of further active devices in the form of the IGBTs has significant cost implications for this implementation.

SUMMARY

Embodiments disclosed provide a drive circuit that is able to exhibit relatively low levels of total harmonic distortion, is cost effective in implementation and more efficient.

According to disclosed embodiments there is provided a drive circuit for an electrical load comprising: a multi-tap transformer, a set of switchable power cells connected to the output of the or each phase of the transformer for the or each tap, each power cell being switchable to provide electrical power to an output of the circuit, each power cell comprising a rectifier circuit having an AC input and being connected across serially connected DC link capacitors, an inverter connected across the DC link capacitors and a bi-directional switch connected from the DC link capacitors to between the or each phase of the AC input. For a multi-phase system the bidirectional switches can be connected according to a Y or Delta configuration. Preferably for reasons of cost and size the transformer is a non-phase shifting transformer, and preferably a multi-tap transformer for the or each phase of the output.

The circuit may include a bypass circuit connected across the inverter output. The power cells may be connected in series to the load through the bypass circuit.

The bidirectional switches can take various forms. For example bipolar or insulated gate bipolar transistors, gate turn-off thyristor pairs, field effect transistor pairs or transistor/diode arrangements providing bidirectional switching. Likewise electro-mechanical switches could be used. The disclosed embodiments are not limited to a type of bidirectional switch. The embodiments provide an efficient and cost-effective solution to the improvement of power factor in an electrical drive circuit.

DRAWINGS

Embodiments will now be described by way of example with reference to the accompanying drawings in which.

DETAILED DESCRIPTION

Figure 1:
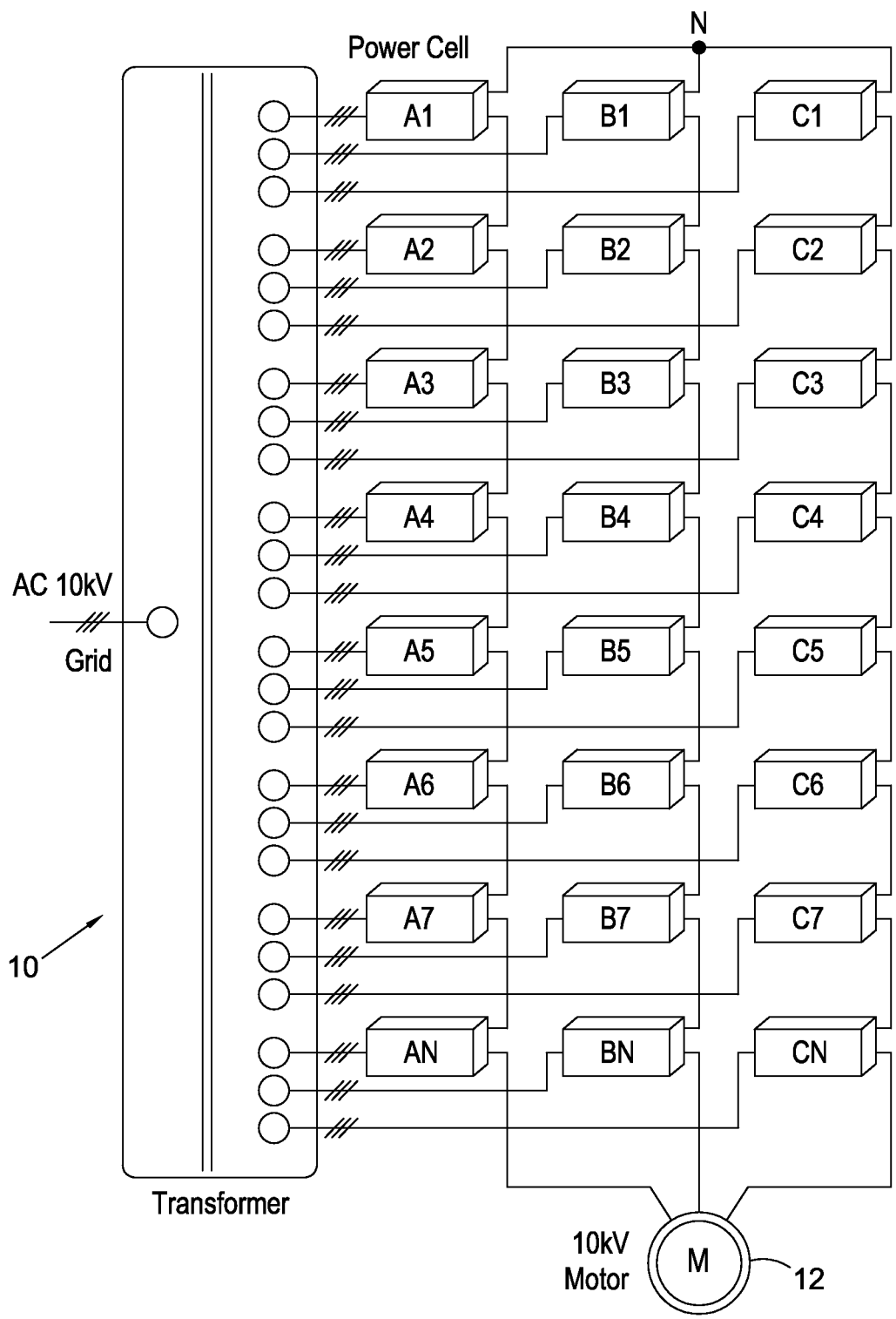
FIG. 1 is a drive circuit for an electrical load using a transformer.

Referring to FIG. 1, a drive of a three phase motor comprises a non-phase shifting transformer 10 having a secondary with outputs at various tappings A-N corresponding to the voltage ratios required. The output of the tappings are each three phase voltages supplied to power cells A1, B1, C1-AN, BN, CN. The power cells provide the supply voltages A, B and C to the electrical load 12 which may be, for example, a 10 kV 3-phase induction motor as illustrated. Any other suitable AC electrical load can be driven by the same drive circuit. In the following the rating of the circuit components is assumed to be suitable for the power handling capability of the circuit and the application to which it is put.

For example, some of the switches are power switching devices and the accompanying components have power handling characteristics as appropriate.

Figure 2:
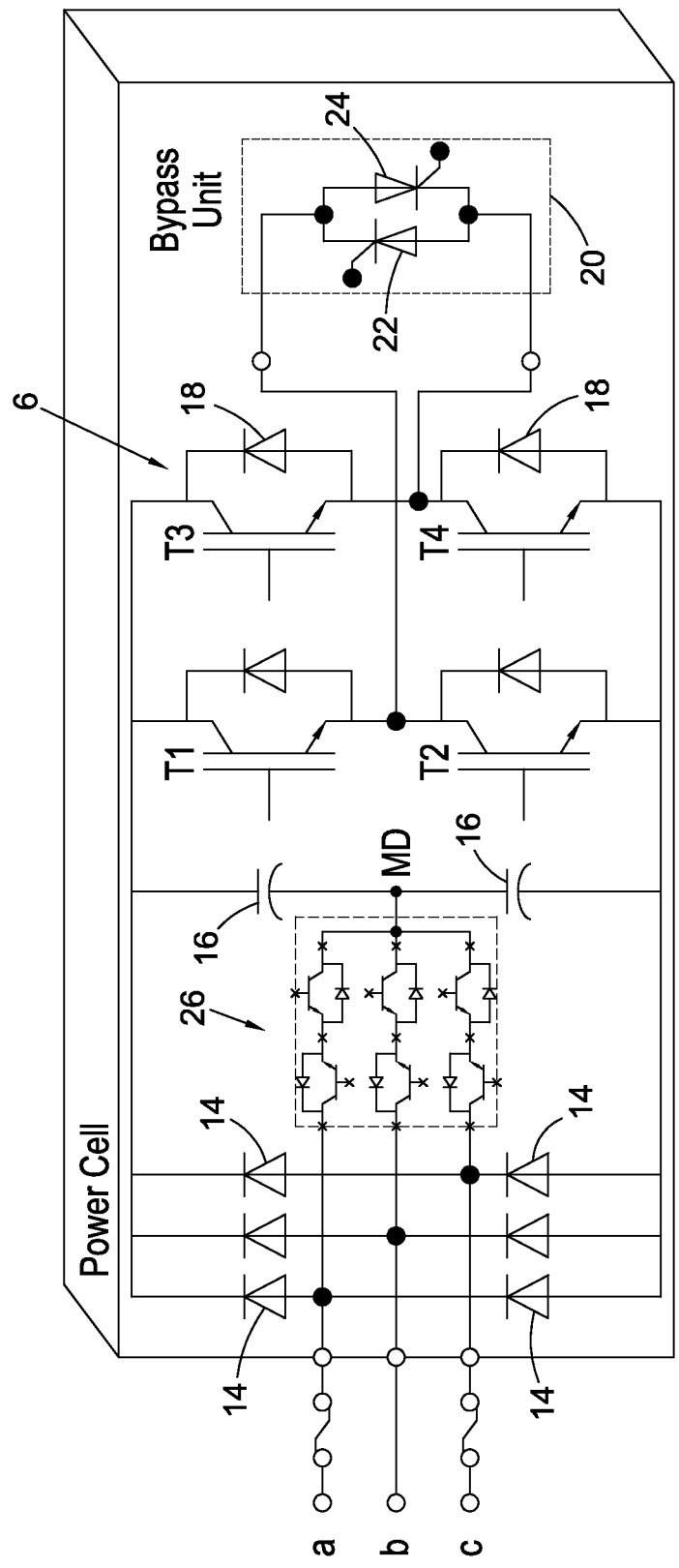
FIG. 2 is a circuit diagram of a power cell.

FIG. 2 illustrates the circuit of each power cell depicted in FIG. 1. It comprises phase inputs a, b and c corresponding to the outputs of the transformer 10. The inputs are connected between pairs of rectifier diodes 14 for each phase. The diode pairs are each connected across a pair of serially connected DC link capacitors 16 and an H-bridge configuration of power transistors T1-T4 forming an inverter 6. Each of the transistors has its own anti-parallel diode 18 connected to conduct from emitter to collector of the transistor. A bypass unit 20 comprises a pair of thyristors 22/24 connected in parallel and across the junctions between the transistors T1/T2 and T3/T4 of the H-bridge circuit. The capacitors 16 are of the same value. The connection between the capacitors defines a voltage mid-point MP.

Figure 3:
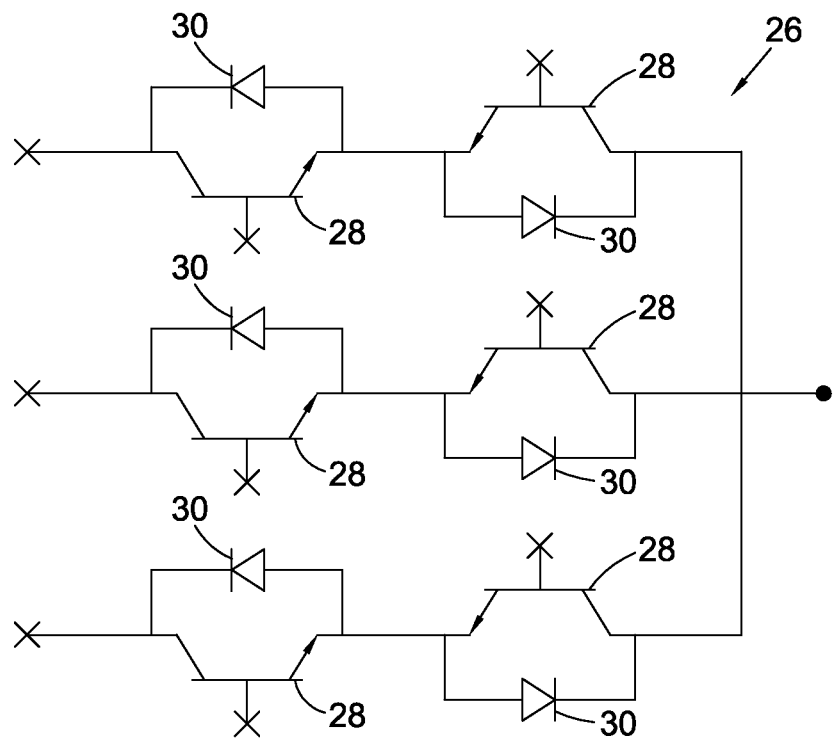
FIG. 3 is a circuit diagram of the rectifier used in the circuit of FIG. 2.

According to this embodiment a bi-directional switch circuit 26 is connected between the pairs of diodes 14 for each phase and between the DC link capacitors 16. The bi-directional switch 26 is shown in FIG. 3. In this embodiment the bi-directional switch 26 is a pair of serially connected back-to-back bipolar power transistors 28 connected in a common emitter configuration for each phase, and corresponding anti-parallel diodes 30 each connected across a corresponding one of the transistors 28 to conduct with the other of the transistors. The output of each power cell AN, BN, CN is available to be delivered to a corresponding phase of the electrical load 12. The voltage of the power supply depends on the tapping of the transformer that is active according to the switching of the bypass circuits which effectively connect the chosen transformer tapping to the phase of the electrical load.

The output of each power cell is a pulse width modulated voltage caused by actuation of the H-bridge transistors T1-4. The outputs of the power cells are connected to the load through the bypass units of each of the power cells. By controlling the thyristors of the bypass circuits the selected cell for the chosen voltage can be applied to the corresponding phase of the load. As shown the power cells are connected in a Y configuration but can equally well be configured in a Delta configuration.

Figure 4:
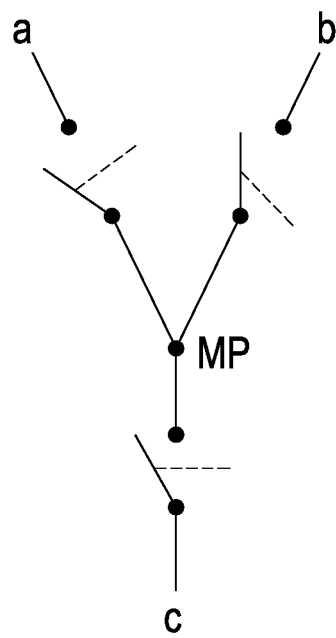
FIG. 4 is a schematic of the configuration of switches in FIG. 3.
Figure 5:
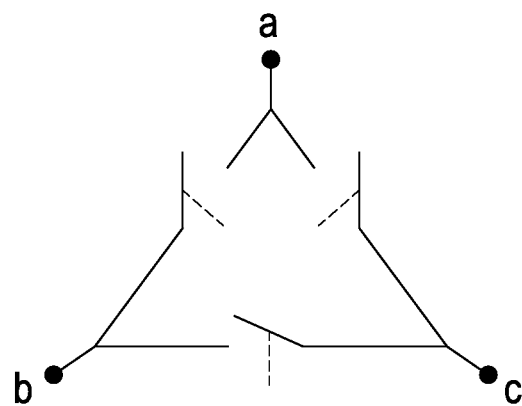
FIG. 5 is a schematic of an alternative configuration of switching.

FIG. 4 is a schematic representation of the bidirectional switches of FIG. 3. The switches 28 are connected in a Y configuration. The same circuit can be implemented using a Delta configuration as shown schematically in FIG. 5. In this case there is no star point to connect to the midpoint between the DC link capacitors which are simply connected between the power rails. This has the advantage of making the bidirectional switch circuit more independent of the rest of the circuit components. In a Y configuration there will be a midpoint between two capacitors. In a Delta configuration, the capacitor can comprise a single element or have multiple elements according to the voltage.

Figure 6:
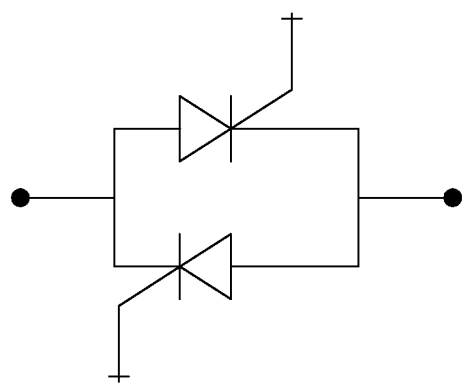
FIGS. 6, 7 and 8 are bidirectional switches.
Figure 7:
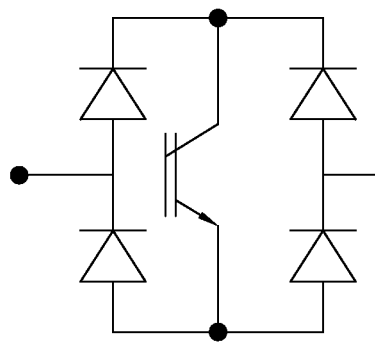
Figure 8:
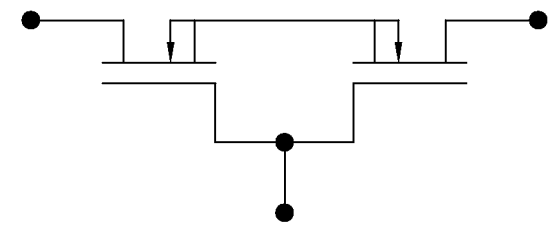

The bidirectional switches of the circuit can take many forms. For example, the bipolar transistors shown can be replaced by insulated gate bipolar transistors. Some more are illustrated in FIGS. 6, 7 and 8. FIG. 6 is a bidirectional switch based on the use of gate turn-off thyristors 34. The thyristors 34 are connected in parallel and to conduct in opposite directions. FIG. 7 shows a bidirectional switch based on the use of a bridge of pairs of diodes 36 each connected across an IGBT or metal oxide silicon field-effect transistor (MOSFET) 38. FIG. 8 is a bidirectional switch that is the MOSFET equivalent of the switch of FIG. 3 comprising a pair of source-coupled MOSFET devices 40. Indeed, any switching devices arranged to be bidirectional can be used and an electromechanical switching arrangement is applicable.

The use of a multi-output secondary of a non-phase shifting transformer as an isolated source of power for the load enables the circuit to produce a floating DC supply. This enables the series connection of the power cell modules. The circuit is controllable by the use of the power cell modules to produce a low harmonic output AC as a cascade drive for the load. The rectified DC is produced by the combination of the rectifier diodes 14 and the relatively low cost bi-directional switch circuit 26 which provides low cost power factor correction on each power cell output.

The invention claimed is:

1. A drive circuit for an electrical load, the drive circuit comprising a multi-tap non-phase shifting transformer, and a set of switchable power cells, the multi-tap non-phase shifting transformer having a primary winding and a secondary winding, the secondary winding having multiple output taps each corresponding to a different voltage ratio, the set of switchable power cells connected to an output of each phase of the transformer for each output tap, each power cell being switchable to provide electrical power to an output of the circuit, each power cell comprising a rectifier circuit having an AC input and being connected across serially connected DC link capacitors, an inverter connected across the DC link capacitors and a bi-directional switch connected from the DC link capacitors to between each phase of the AC input.

2. A circuit as claimed in claim 1, including a bypass circuit connected across the inverter output and being configurable to connect the output to the electrical load.

3. A circuit as claimed in claim 2 in which the power cells are connected in series with each phase of the load through the respective bypass circuits.

4. A circuit as claimed in claim 1 in which each bi-directional switch comprises a pair of transistors connected with common emitters and a bypass diode connected across each transistor.

5. A circuit as claimed in claim 1 in which each bidirectional switch comprises gate turn-off thyristors connected in parallel and to conduct in opposite directions.

6. A circuit as claimed in claim 1 in which the bidirectional switch comprises pairs of diodes in series connected in parallel across a transistor.

7. A circuit as claimed in claim 1 in which the bidirectional switch comprises a pair of source-coupled MOSFET devices.

8. A circuit as claimed in claim 1 in which the inverter comprises an H-bridge circuit.

9. A circuit as claimed in claim 1 in which the rectifier circuit is a diode rectifier circuit.

* * * * *